Patented Feb. 8, 1944

2,340,908

UNITED STATES PATENT OFFICE 2,340,908

HYDROCARBON SYNTHESIS

Charles L. Thomas, Riverside, Ill., assignor to Universal Oil Products Company, Chicago, Ill., a corporation of Delaware No Drawing. Application November 25, 1942,
Serial No. 466,940

7 Claims. (Cl. 260—666)

This invention is concerned with the synthesis of particular types of hydrocarbons broadly known as bicycloalkenes.

It is more specifically concerned with the interaction of a dimer of a conjugated cyclodiolefin with monoolefins to produce compounds of this character.

The art of hydrocarbon synthesis has undergone great expansion in recent years and many hydrocarbon compounds having specific physical and chemical properties have been produced, many of which are not normally available in such naturally occurring substances as crude petroleum or coal distillation products or the hydrocarbon mixtures obtained by the pyrolysis of these primary substances. The present process makes available the ready production of hydrocarbons which have properties of the class of cycloterpenes and camphors. Many of these synthetically producible compounds have value in themselves or are utilizable as intermediates for the manufacture of other compounds having special utilities.

In one specific embodiment the present invention comprises a process for the manufacture of bicyclo-alkenes by interacting dicyclopentadiene and monoolefins.

Reactions which characterize the present process are typified by those occurring between dicyclopentadiene and ethylene. Cyclopentadiene, being a conjugated cyclodiolefin, has marked tendencies to polymerize so that it is ordinarily encountered in its dimeric form. The reactions, therefore, may possibly involve the primary thermal depolymerization of the dicyclo compound and the further reaction of the decomposition product with an olefin such as ethylene, or the reaction may take place in one stage. Since it is difficult to follow the exact course of these types of reactions, it is not intended to offer these alternatives as a complete explanation of what actually occurs. A reaction which typifies those occurring in accordance with the present invention is given below using generally accepted structural formulae for each of the compounds involved:

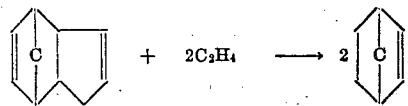

Dicyclopentadiene  Ethylene  2,2,1-bicycloheptene-2

In accordance with the invention dicyclopentadiene is reacted with different olefins such as ethylene in the above equation to form compounds typified by the bicycloheptene shown in the formula. The use of other mono-olefins than ethylene such as propylene, butylenes, amylenes, hexylenes, etc. will yield a number of bicyclo-alkenes having different substituent groups so that by the use of different reactants a considerable number of analogous compounds is producible. Cycloolefins, e. g., cyclohexene, may also be reacted with dicyclopentadiene after the fashion outlined above; cyclohexene gives a tricyclic product.

It is not essential that the olefinic material be a hydrocarbon. Other functional groups may be present. Thus, unsaturated alcohols, halides, esters, aldehydes, ketones, etc., may be used. For example, allyl alcohol, allyl chloride, vinyl chloride, vinylidene chloride, vinyl acetate, methyl methacrylate, etc., are considered olefins for the purpose of this invention.

The reactions of the present process may be brought about under particular thermal conditions or they may be brought about in the presence of catalysts. Ordinarily, a weighed amount of dicyclopentadiene is charged to a pressure vessel, and ethylene or other olefin is introduced under pressure in an amount necessary for the desired reaction. The reactions are exothermic and may be brought to substantial completion when the pressure vessel is heated to a temperature of about 200° C. The pressure which is developed during the reaction period may be as high as 50 to 100 atmospheres or higher. The preferred temperatures, pressures and molal ratios of reactants will vary with the olefin used for reaction with the dicyclopentadiene.

Continuous operations may also be carried out by passing mixtures of dicyclopentadiene and olefins through heated reaction zones maintained at a temperature found optimum for the production of a given reaction product. In such continuous processes, temperatures of from about 100 to about 400° C., pressures of from about 25 to about 100 atmospheres, and liquid hourly space velocities of hydrocarbons of from about 0.1 to about 10 may be employed.

The following example is given as typical of the reactions and products within the scope of the invention, although it is not intended to limit the invention in exact correspondence with the data presented.

800 grams of technical dicyclopentadiene was charged to a three-liter pressure vessel capable of being rotated during a heating period. The vessel was closed and the residual air flushed out with nitrogen after which ethylene was introduced until a pressure of 50 atmospheres at 20° C. was observed.

The pressure vessel was then rotated and gradually warmed. The temperatures and pressures observed at different times during the heating period are shown in the following tabulation:

Table I

| Time, hours | Temperature | Pressure |
|---|---|---|
| | °C. | Atm. |
| 0 | 20 | 50 |
| 1 | 85 | 65 |
| 2 | 198 | 96 |
| 3 | 200 | 40 |
| 3.5 | 200 | 40 |
| 4.5a | 30 | 20 |
| 4.5 | 30 | 50 |
| 5 | 80 | 50 |
| 6 | 198 | 73 |
| 7 | 200 | 80 |
| 8 | 23 | 32 | a The pressure vessel was cooled and repressured to 50 atmospheres with ethylene.

After the heating period was completed the pressure vessel was cooled, the excess of ethylene released and 960 grams of product recovered. This run was repeated until a total of 3000 grams of dicyclopentadiene had been charged and 3800 grams of reaction product recovered. Calculations indicated that a total of 800 grams of ethylene had reacted. The recovered hydrocarbon product gave the following distillation data:

Table II

| | | Grams |
|---|---|---|
| Cut 1 | 50-94.7° C | 154 |
| Cut 2 | 94.7° C | 1,968 |
| Cut 3 | Above 94.7° C | 1,598 |
| | Loss | 80 |

The first cut consisted of low boiling liquid hydrocarbons which contained small amounts of cyclopentadiene. The second cut was a normally solid material which melted at 46° C. and boiled at 96.1° C. (corrected) which corresponded closely to the melting and boiling points of 2,2,1-bicycloheptene-2. Cut three contained small amounts of unidentified crystalline material but the major portion was unreacted dicyclopentadiene.

The bicycloheptene was hydrogenated by the use of a nickel catalyst at a temperature of 50° C. and a pressure of 100 atmospheres of hydrogen. The hydrogenation occurred rapidly as indicated by the drop in pressure as the temperature was maintained. After cooling the pressure vessel, the solid bicycloheptane was recovered by dissolving in pentane, filtering to remove catalyst and distilling off the pentane. The solid bicycloheptane recovered boiled within the range of 105.3 to 105.5° C.

I claim as my invention:

1. A process for the manufacture of bicycloalkenes which comprises interacting dicyclopentadiene and a monoolefin.

2. A process for the manufacture of bicycloalkenes which comprises interacting dicyclopentadiene and ethylene.

3. A process for the manufacture of bicycloalkenes which comprises interacting dicyclopentadiene and propylene.

4. A process for the manufacture of bicycloalkenes which comprises interacting dicyclopentadiene and a butylene.

5. A process for the manufacture of bicycloalkenes which comprises interacting dicyclopentadiene and a monoolefin at a temperature of from about 100 to about 400° C. and under a pressure of from about 25 to about 100 atmospheres.

6. A process for the manufacture of bicycloalkanes which comprises interacting dicyclopentadiene and a monoolefin to form bicycloalkenes and hydrogenating said bicycloalkenes to produce said bicycloalkanes.

7. A process for the manufacture of 1,2,2-bicycloheptene-2 which comprises interacting dicyclopentadiene and ethylene at a temperature of about 200° C. and a pressure of from about 50 to about 100 atmospheres.

CHARLES L. THOMAS.